Feb. 23, 1943.     E. VOSSEN     2,312,276
ELECTRIC STOP MOTION CONTROLLER FOR KNITTING MACHINES
Filed Jan. 22, 1942
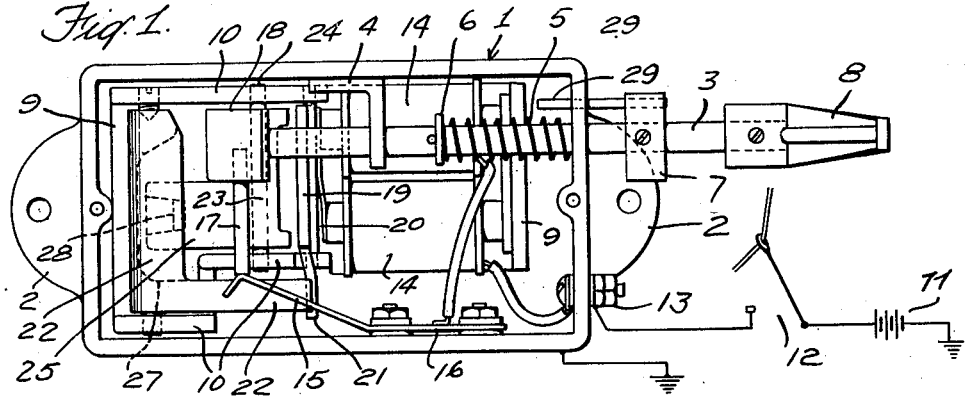
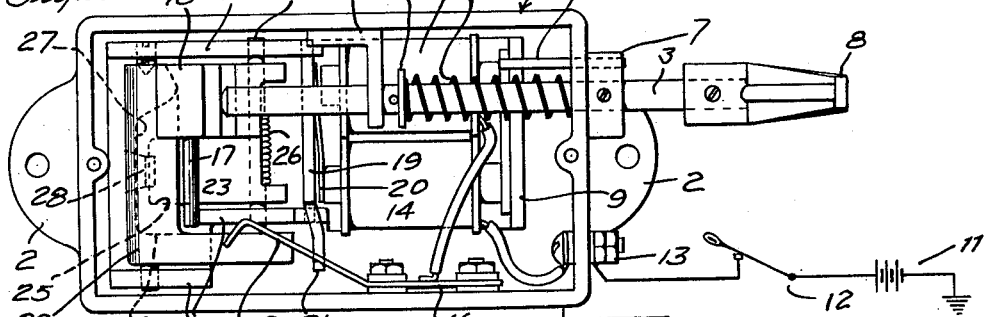
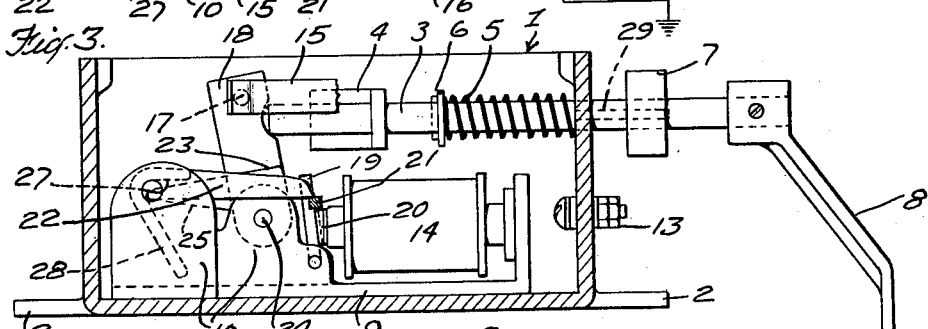
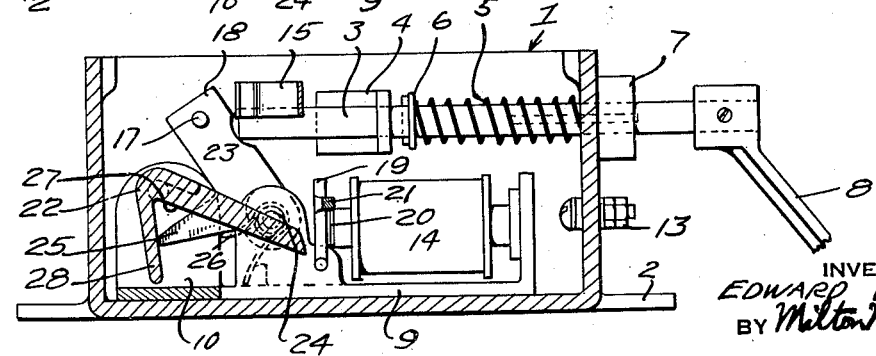
INVENTOR
EDWARD VOSSEN
BY Milton M Leichter
ATTORNEY Patented Feb. 23, 1943

2,312,276

UNITED STATES PATENT OFFICE 2,312,276

ELECTRIC STOP MOTION CONTROLLER FOR KNITTING MACHINES

Edward Vossen, Brooklyn, N. Y., assignor to Stop Motion Devices Corporation, Brooklyn, N. Y., a corporation of New York Application January 22, 1942, Serial No. 427,812

2 Claims. (Cl. 66—163)

My invention relates to controller mechanisms intended for use as parts of electric stop motions to cut off the driving current of knitting and similar machines by effecting a shift of their stop handles. It is intended especially for use with such machines as require only a short thrust on their stop handles to cut the current.

An ordinary controller for knitting machines has a spring actuated thrust member intended to move the stop handle of the machine, and in operative position caught and held from movement by a pawl which is magnetically released when a current is made by operation of a circuit closer governed by conditions in the travelling thread. In this latch pawl, in effect a coupling between the mechanically operated thrust rod and the electrically operated release mechanism, are centered most of the difficulties in the art.

For controllers to operate machines requiring a long thrust on their stop handles the latch pawl has been found indispensable. The present invention advances the art so far as short thrust controllers are concerned by eliminating the pawl with its essential imperfections. It has the limitation that when enlarged for long thrust purposes it becomes cumbersome, but for short thrusts it affords accuracy, economy, speed, simplicity of arrangement, reduction of parts and of friction, and amelioration of dust difficulties in operation.

Fig. 1 represents a front view of the controller in loaded or operative position, with the face of the housing removed.

Fig. 2 shows the same view with the controller in discharged or inoperative position. Both Figs. 1 and 2 show the electric circuit.

Fig. 3 gives a side view, as of Fig. 1 rotated 90 degrees to the left, with the side of the housing removed, the controller being in loaded position.

Fig. 4 gives the same view as Fig. 3, but with the controller in discharged or inoperative position, the electric circuit in this and Fig. 3 being omitted.

The device has a housing 1 with ears 2—2 for attaching it to the machine. A thrust rod 3 lies longitudinally in the housing toward one side thereof, entering through an aperture in one end of said housing and passing through another aperture in an interior stud 4 fixed in the wall thereof, being longitudinally movable in said apertures but closely positioned against transverse movement. Mounted on and actuating rod 3 is a spiral mainspring 5, the lower end of which rests on a collar 6 fixed to said rod and the upper end against the end of the housing. A collar 7 is mounted exteriorly to said housing on rod 3 and is longitudinally adjustable thereon to limit the thrust of said rod to the needs of the knitting machine. The exterior portion of rod 3 carries the bracket arm 8 to cooperate with the stop handle of the knitting machine and transfer to it the motion of said rod.

Interiorly fixed to the back of housing 1 is a base plate 9 upon which are mounted the electromagnetic and latch mechanisms, the upper part of said plate (Figs. 3, 4) being bent at right angles to the main or back portion thereof, and parallel to the end portions of said housing, to stay said mechanisms in position, and the side portions of said base plate being similarly brought up parallel with the sides of said housing into flanges 10—10, which are bored to serve as bearings for the pivot portions of the latch mechanism.

Tracing the electric circuit when the controller is loaded for normal operation (Fig. 1) it runs from the source 11 through the stop motion circuit closer 12, open in normal operation, enters housing 1 by insulated screw 13, passes through the windings of the electromagnet 14 thence to a leaf spring 15 fastened interiorly to the housing by an insulated screw 16, from said leaf spring to contact rod 17 attached to cam 18 of rocker 23, and to housing 1, which is grounded. Contact rod 17 rises to meet leaf spring 15 only when the controller is loaded by thrusting up rod 3 against spring 4. The circuit when the controller is discharged and inoperative (Fig. 2) is the same save that the circuit is closed at the stop motion end or knot detector 12, and contact between leaf spring 15 and rod 17 is broken by the operation of mainspring 5 in thrusting down rod 3, cam 18 and rod 17 attached thereto.

An armature plate 19 is hinged on lugs extending from either end of its fixed edge (Figs. 1, 2, 3, 4) turning in bearings bored into flanges 10—10, and swings to and from the core ends of electromagnet 14, as to which the armature lies leaf spring 20 in normal operation. A lug 21 ex-perpendicular but held separate by the opposing tends from one end of the free edge of armature plate 19 in position to engage in normal operation, and disengage as the armature is magnetically drawn to the cores, the end of a radial arm of latch lever 22.

A rocker member 23 turning on a pivot 24 in bearings bored in the raised flanges 10—10 consists of a transverse pivot portion and, extending radially therefrom at different angles, a broad working cam 18 and a locking tongue 25. A wire spring 26 (Figs. 2, 4) mounted on pivot post 24 rests one end against a projection of base plate 9 and presses with the other end against locking tongue 25 to rotate it and the entire rocker 23 clockwise up to the limit fixed by the longitudinal position of the end of rod 3 in contact with working cam 18.

A latch lever 22 is also pivoted to turn on bearings bored in the raised flanges 10—10, having a transverse pivotal portion and, extending radially therefrom, an arm of sufficient length to cooperate with, pass its bevelled end under and engage, said lug 21, and, also extending radially but at a different angle from said arm, a counterarm or guide rod 28 spaced on the transverse pivotal portion of said lever 22 to cooperate with locking tongue 25 of said rocker member. The transverse pivotal portion of said latch lever 22 is cut away to afford, at the point where radial counterarm 28 branches therefrom, recess 27 into which in normal operation locking tongue 25 is rotated and held by both the pivotal and the guide rod portion 28 of said latch lever 22 until the latter, in the process of discharging the controller, becomes disengaged from said lug 21, and said locking tongue 25 and the whole rocker member 23 of which it is a part are released to rotate and clear the path for thrust rod 3 (Figs. 3, 4).

A stay rod 29 (Fig. 1) is fixed at one end toward the outer edge of the interior side of disc collar 7, passes movably through an aperture in the end portion of housing 1 into the interior thereof and parallel with thrust rod 3, and serves to stabilize the latter against rotation.

To load the controller for normal operation in knitting the operator passes the thread through the end detector or knot detector circuit closer 12, the circuit being held open. He then presses thrust rod 3 against mainspring 5, permitting cam 18 with the whole of rocker 23 thus released from the fixation of said rod to rotate clockwise (Fig. 3) under pressure of wire spring 26 (Figs. 2, 4) till the locking tongue portion of said rocker arrives within the recess 27 cut in the transverse pivotal portion of latch lever 22, rotating the same counterclockwise (Figs. 3, 4) till the bevelled end of the latch arm of lever 22 has passed beyond, and on relaxation of pressure by the operator returns to lock against, lug 21 at the end of the free edge of armature 19. This locking in position of lever 22 with its counterarm 28 in turn locks into position locking tongue 25 of rocker 23 and with it cam 18 thereof, on the broad shelf of which the end of rod 3 rests under mainspring tension.

When conditions in the thread cause the end detector or knot detector 12 (Figs. 2, 4) the circuit to close, the current passes through the circuit (Fig. 1), from insulating screw 13 to coils 14, to attachment 16, leaf spring 15, contact rod 17 and ground, the energized magnet 14 drawing to it the armature 19 and lug 21 thereon till it disengages the end of latch arm 22, unlocking said latch lever and with it rocker 23 to rotate and clear the path for the thrust of rod 3 under actuation of mainspring 5, which thrust, conveyed by bracket 8 to the stop handle of the machine, cuts off its current.

The arrangement of the parts adds the valuable convenience that the thrust of rod 3 on discharge breaks the circuit at the connection of rod 17 and leaf spring 15, sparing waste of electricity and the operator a shock as he grasps the controller to reload.

The device is proof against accidental discharge and has the advantage that intervening between the electrically controlled armature and the knitting machine are only two working parts, first, the latch lever, and, second, the cam, rod, bracket and stop handle, all moving together as one under a single impulse, and mechanically a single part.

I claim:

1. In an electric stop mechanism for mechanically stopped power driven machines, the combination of a circuit closer governed by conditions in the material operated on of a controller comprising a housing, means for connecting said housing with the machine, a stud interiorly attached to said housing, apertures in said stud and in said housing, a rod passing into said housing and through said apertures and held therein longitudinally movable but stabilized against transverse movement, means attached to said rod to carry the movement thereof to the stop mechanism of said machine, a mainspring impelling said rod, a source of electricity, an electromagnet fixed interiorly to but insulated from said housing, an armature governed by said electromagnet, a rocker member pivoted to said housing and having a cam portion cooperating with said rod, a spring exerting tension to rotate said rocker member in one direction, a latch member pivoted in said housing and connecting with said rocker member and armature so that when said stop mechanism is in operative position with the circuit open and said rod pressed against the tension of said mainspring said cam portion is rotated against said rod and is caught and held in position together with said rod by the engagement of said armature with said latch member, and when said circuit is closed by conditions in the material operated on said electromagnet is energized and disengages said armature from said latch member and said cam and rod are released to advance under impulsion of said mainspring and convey said movement to the stop mechanism of the machine.

2. In a stop motion for mechanically stopped power driven machines, a combination of a housing, a circuit closer governed by conditions in the material operated on, a longitudinally movable rod attached to said housing, a spring impelling said rod in one direction, means connecting said rod with the stop mechanism of said machine, a holding member pivoted to said housing and actuatable by said rod under impulsion of said spring, a release member under control of an electric current, and means for engaging said release member with said holding member to fix the same in position to arrest the movement of said rod, so that when said machine and mechanism are in normal operation with the electric circuit open said holding member interposes against said rod a surface arresting the same against movement under the impulsion of said spring, and when said circuit is closed said release mechanism is electrically actuated to shift from engagement with said holding member and said rod advances under impulsion of said spring, rotates said holding member clear and actuates the stoppage mechanism of the machine.

EDWARD VOSSEN.